United States Patent Office 3,412,174
Patented Nov. 19, 1968

3,412,174
HYDROGENATION PROCESS EMPLOYING A
TRANSITION METAL CATALYST
Wolfram R. Kroll, Linden, N.J., assignor to Esso Research
and Engineering Company, a corporation of Delaware
No Drawing. Continuation-in-part of application Ser. No.
378,034, June 25, 1964. This application Aug. 19, 1966,
Ser. No. 573,497
36 Claims. (Cl. 260—683.9)

ABSTRACT OF THE DISCLOSURE

Active hydrogenation catalysts are prepared by the reaction of organoaluminum or organoaluminum monoalkoxide reducing agents with transition metal salts; the catalysts may be further activated by the addition of Lewis bases, weak organic acids, or oxygen.

This application is a continuation-in-part of copending Ser. No. 378,034 filed June 25, 1964, now abandoned, which in turn, is a continuation-in-part of copending Ser. No. 281,347 filed May 17, 1963 now U.S. Patent No. 3,323,902.

This invention relates to novel catalyst systems which have uitility in a number of environments, such as hydrogenation, hydroformylation, isomerization and electrochemical cells. More particularly, this invention relates to complex catalyst systems or Ziegler type catalysts and derivatives of such catalysts, all of which exhibit a high degree of activity in the above mentioned environments. In a preferred embodiment of this invention, the stability and/or activity of Ziegler type catalysts is markedly improved by the addition of a third component, i.e. Lewis base, weak organic acid, oxygen, to the catalyst system.

Heterogeneous Ziegler type catalysts are well known in the art. U.S. Patent 2,781,410, for example, discloses a polymerization catalyst which is composed of aluminum trialkyl and trace amounts of colloidal nickel. Despite exhaustive investigations, the potential usefulness of these catalyst systems for reactions other than polymerization and displacement has gone practically unnoticed until the present.

It has now been discovered that it is possible to employ modified Ziegler type catalyst systems in such a manner that complex homogeneous catalyst solutions, useful for hydrogenation of fatty acids for foodstuffs, etc., can be prepared.

Thus, in accordance with this invention, a transition metal salt or compound, or mixtures of such salts and/or compounds, is reduced with a Group III organometallic compound under conditions which favor the formation of a metal organic complex which contains the transition metal in a reduced valence state. Due to the nature of the various types of reducing agents that are applicable to this invention, the use of excessive amounts of a particular reducing agent leads to a poisoning of the catalyst and consequent severe restriction of catalytic activity. In an embodiment of this invention, however, poisoned catalyst systems may be advantageously employed as selective hydrogenation catalysts. In a preferred embodiment of this invention, catalyst poisoning may be eliminated by the addition of a third component, i.e. Lewis base, weak organic acid, oxygen, to catalyst systems which tend to become poisoned. In this latter embodiment, it has also been found that an enhancement of catalytic activity occurs in many instances.

The metal salts or compounds reduced to form the catalyst system of the present invention are transition metal salts or compounds. Thus, metals selected from each of Groups I-B through VIII-B of the Periodic Chart of the Elements can be successfully employed. Preferred metals are those having an atomic number greater than 20 and less than 76. Some preferred metals are: titanium, vanadium, chromium, manganese, iron, cobalt, nickel, copper which have an atomic number greater than 20 and less than 30, along with Group VIII noble metals, e.g. platinum and rhenium. Particularly preferred, however, are iron, cobalt, nickel which elements have an atomic number greater than 25 and less than 29, and platinum, while nickel and cobalt, especially cobalt, are the most desirable.

The selection of the anionic component of the transition metal salt or compound is not critical and both organic as well as inorganic components may be employed. Typical examples of inorganic radicals that may be employed are halides, e.g. chloride, bromides, $SiF_6$-cyanides, azides, etc. However, organic radicals, such as acetates and naphthenates, are preferred anionic components because of their excellent solubility and drying characteristics. A particularly preferred organic component is the chelate, e.g. the acetylacetonate, due to its excellent solubility and ready availability. Of course, other chelates such as dimethylglyoxime derivatives, tropolonates, or salicyladehydes, etc. can also be utilized. Other organic components that may be employed are the salts of organic acids, e.g. acetates, propionates, butyrates, valerates, etc. stearates, laurates, oleates, and other fatty acid salts, also salts of alcohols such as butanols, hexanols, octanols, glycols, eicosanols, cyclododecanol, etc. and alkoxides, e.g. ethoxides, benzoates, carbonates, acetylacetonates, and the like. The transition metal compound can be a metal salt and may be described as: a salt of an acidic organic compound in which the organic acid has a pKa in the range of 1–20; may be a carboxylic acid of pKa less than 9; from 1–25 carbon atoms; from 1–2 acidic hydrogen atoms; and containing only carbon, hydrogen and oxygen; and can be monobasic with a solubility in benzene in parts per 100 parts at 25° C. of at least 0.1 part.

The selection of a reducing agent is an important feature of this invention since it may affect the activity of the catalyst system. Generally, Group I to Group III organometallic compounds can be employed, e.g. aluminum, sodium, etc. However, organoaluminum or organomagnesium compounds are preferred, particularly the organoaluminum compounds. Thus, this invention will now be discussed with reference to organoaluminum compounds, bearing in mind that the other organometallics will operate similarly. The organoaluminum reducing agents can be represented by the following formulae:

I. $AlR_2OR$
II. $AlR_3$ wherein in Formula I R is a $C_1$–$C_{20}$ hydrocarbyl radical, preferably selected from the group consisting of $C_1$–$C_{20}$ alkyl, e.g. ethyl, propyl, isopropyl, butyl, isobutyl, pentyl, hexyl, heptyl, octyl, etc. both iso- and normal; cycloalkyl, e.g. cyclopentyl, cyclohexyl, cyclopentadienyl; aryl, e.g. phenyl, naphthyl; and alkaryl, e.g. benzyl and is preferably $C_2$–$C_{20}$ hydrocarbyl and more preferably $C_2$–$C_4$ alkyl. In Formula II R may be selected from the group consisting of hydrogen, halogen, and $C_1$–$C_{20}$ hydrocarbyl and at least one R is hydrocarbyl, and the hydrocarbyl radicals are preferably as fully described above for Formula I. Although these reducing agents can be used interchangeably in many reactions, it is often preferable to employ the reducing agent shown in Formula I, hereinafter referred to as the monoalkoxide reducing agent. Typical examples of the reducing agents that may be employed are: $(C_2H_5)_2AlO(n-C_4H_9)$, $Al(i-C_4H_9)_3$, $Al(C_2H_5)_3$, $Al(C_3H_7)_3$, $Al(i-C_4H_9)_2H$, triphenyl aluminum, trihexadecyl aluminum, ethyl aluminum sesquichloride, etc.

The molar ratio of reducing agent to transistion metal salt is usually reported in terms of the molar ratio of aluminum to transition metal. Thus, regardless of the reducing agent employed, the molar ratio of aluminum to transition metal should be at least 1/1, and usually an excess is employed. Where the monoalkoxide reducing agent of Formula I is employed, the molar ratio of aluminum to transition metal may range as high as 100/1, but is preferably about 5/1 to about 30/1. The use of excessive aluminum to transition metal molar ratios for the reducing agent of Formula II leads to poisoning of the catalyst system. Thus, when the $AlR_3$ type reducing agent is employed the aluminum/transition metal molar ratio should be in the range of about 1/1 to 15/1, preferably 1/1 to 10/1 and more preferably 1/1 to 4/1. By comparison, prior art, for example U.S. Patent 2,781,410, describes conventional Ziegler type catalysts which utilize only a trace amount of transition metal and have molar ratios as high as 5000/1. While no sufficient explanation is available, experimental data indicate that ratios in excess of 10/1 tend to poison the catalyst and severely limit catalytic activity (increasing molar ratios lead to increased poisoning).

While not wishing to be bound by any particular theory, it is believed that the presence of excessive amounts of the $AlR_3$ type reducing agent leads to further reaction of the reducing agent with the transition metal salt, i.e. alkylation and destruction of the chelate ligands where such are employed, which in turn leads to a poisoned catalyst. This poisoning effect is not noticed when the monoalkoxide reducing agent is employed, since it is believed that the $AlR_2OR$ type reducing agent is a less strong alkylating agent than the $AlR_3$ type. For this reason, the $AlR_2OR$ reducing agent is preferred.

In a preferred embodiment of this invention, a third component can be utilized to improve the stability and/or enhance the catalytic activity of $AlR_3$ type reducing agents. This third component, selected from the group consisting of Lewis bases, weak organic acids, and oxygen, when added in controlled amounts greatly enhances the $AlR_3$ catalyst system. This result is particularly surprising since some of these compounds are known to be catalyst poisons, i.e. oxygen is known to poison Raney type catalysts. When the third component is employed, the molar ratio of aluminum to transition metal may vary over a range similar to that for the monoalkoxide reducing agent.

Thus, the complex catalyst systems of this invention may be more specifically described as: (A) the reaction product of a transition metal salt and an organoaluminum compound of the formula $AlR_2OR$; (B) the reaction product of a transition metal salt and an organoaluminum compound of the formula $AlR_3$; and (C) the reaction product of a transition metal salt, an organoaluminum compound of the formula $AlR_3$ and a third component selected from the group consisting of Lewis bases, weak organic acids and oxygen.

When the third component is utilized in the system denoted as (C) above, the improved activity and stability of the catalyst complex is believed to result from the conversion of free $AlR_3$ into other species that are no longer catalyst poisons.

Additionally, it is believed that some third components, i.e. Lewis bases and weak organic acids, participate in the formation of the complex catalyst either by supplying ligands for the reduced transition metal, i.e. in the zero valence state, or by modifying the existing organometallic ligands. While the addition of the third component will stabilize all $AlR_3$ type catalyst sysytems, the Lewis bases and weak organic acids serve dual functions: (1) to eliminate the poisoning effect of excessive amounts of $AlR_3$, and (2) to react with the reduced transition metal complex catalyst by formation of new, superior complex catalyst systems which possess different properties, e.g. greater solubility, increased thermal stability, and the like. The catalyst systems which are particularly enhanced by Lewis bases and weak organic acids are those wherein the transition metal is iron, cobalt, or nickel, particularly iron or cobalt, and most particularly cobalt. The increased activity of such systems is most notable when the anionic component of the transition metal is a chelate, and most preferably when the chelate is the acetylacetonate.

The amount of third component added depends on the amount of reducing agent utilized in preparing the catalyst system. Generally, enough third component should be added so as to result in at least a stoichiometric ratio of third component to reducing agent. It is normally preferred, however, to utilize a slight excess of third component, and molar ratios of third component to organoaluminum reducing agent preferably range from about 1/1 to 10/1, more preferably about 1/1 to 3/1. In cases where the third component is relatively expensive, only enough should be added, i.e. at least stoichiometric ratios, to give the advantageous results of this invention. Normally, the third component is added after the contacting of the organoaluminum compound and the transition metal salt, except as noted hereinafter.

Of the third components that may be utilized in the process of this invention, Lewis bases make up a preferred class. Lewis bases are generally defined as substances that can furnish an electron pair to form a co-valent bond, i.e. an electron pair donor. Lewis bases are also excellent solvents and/or co-solvents for preparing the catalyst and may be used as such. Furthermore, Lewis bases impart an additional activity to the modified Ziegler type catalyst systems described herein. This increased activity is particularly noticeable when cobalt compounds are employed as the transition metal compound for preparing the soluble catalyst system. Preferred Lewis bases are the mono and di-functional ethers, e.g. dioxanes, tetrahydrofuran, 1,2-dimethoxyethane, anisole, diethylether, diisopropyl ether, diphenyl ether, methylethyl ether, diglyme, isopropylphenyl ether, etc. and tertiary amines, preferably having 1 to about 10 carbon atoms, e.g. triethylamine, tripropylamine, tributyl amine and its homologous series, N-methyl morpholine, quinoline, tetrahydroquinoline, and the like; the ethers being particularly preferred.

It has also been discovered that, under the conditions of this invention, the Lewis base may be added to the organoaluminum reducing agent in at least a stoichiometric amount prior to the mixing of the reducing agent with the transition metal compound. This leads to the formation of a Lewis base-organoaluminum complex such as an etherate, which has different alkylation power than the $AlR_3$ reducing agent and which is not a catalyst poison. Reductions using a Lewis base-organoaluminum complex lead to catalysts with superior properties, e.g. higher hydrogenation activity. This effect upon catalyst activity in hydrogenations is quite surprising in view of some recently published literature on Ziegler type catalysts which describes such procedures as being detrimental to the resulting polymerization system. However, not only is this procedure not detrimental but it is also extremely advantageous in certain instances, e.g. the use of cobalt compounds to be reduced by an etherate in the preparation of highly active hydrogenation catalysts.

Another type of third component which may be added advantageously to the Ziegler type catalyst systems is a weak organic acid. Such materials are generally characterized as having weakly ionizable hydrogen atoms. Included among these are primary, secondary and tertiary alcohols and primary and secondary amines having from about to about 20 carbon atoms, and preferably 1 to about 10 carbon atoms. Particularly preferred compounds are the tertiary alcohols in the above-mentioned carbon atom ranges, e.g. tert. butyl alcohol. Illustrative of the weak acids that may be employed are: methanol, hexanol, 2-ethyl hexanol, cyclohexanol, sec. butanol, n-butanol, octanol, cyclododecanol, glycols and the like.

The other type of third component that may be advantageously added to the reduced metal catalyst systems is oxygen, as such, or as an oxygen-containing gas stream, e.g. nitrogen-oxygen, argon-oxygen, or other inert gas-oxygen streams. Preferred, however, is air because of its ready availability.

The reduced metal catalyst system of the present invention can be easily prepared by mixing the organoaluminum reducing agent with the transition metal compound, in molar ratios that are at least stoichiometric with respect to aluminum and transition metal. The conditions of preparation are not critical and in most cases ambient conditions of temperatures and pressures are quite satisfactory. However, reductions may be carried out at temperatures in the range of about $-60°$ C. to $+150°$ C. preferably $-10$ to $+100°$ C. Under circumstances where the transition metal compound does not instantaneously dissolve, the reduction may be accelerated, without deleterious effect, by employing temperatures in the upper portion of the above mentioned range.

The reduction, i.e. preparation of the catalyst, and subsequent hydrogenation is preferably carried out in the presence of an inert solvent, although solvents are not essential to the success of this invention. Among the solvents are: aliphatics, aromatics, partially hydrogenated aromatics, ethers, tertiary amines, quinoline, partially hydrogenated quinolines, some alcohols, etc. Particularly preferred solvents are $C_5$–$C_{20}$ aliphatics, e.g. paraffins, such as pentane, heptane, octane, nonane, decane, and the like; $C_6$–$C_{12}$ aromatics, e.g. benzene. It should be noted that benzene may be employed as a solvent only when subsequent reaction conditions are such that the solvent will not be hydrogenated.

It is quite interesting to note that catalyst systems of transition metal salts and $AlR_3$ reducing agents, when poisoned to a limited extent, i.e. aluminum to transition metal molar ratios of 10/1 to 50/1, preferably 10/1 to 20/1, represent a highly useful technique for conducting highly selective hydrogenation reactions. For example, the hydrogenation of an aliphatic side chain of an unsaturated cyclic compound, selective hydrogenation of acetylenic impurities in olefinic compounds, etc. may be effectively carried out with slightly poisoned catalysts.

The catalyst systems of the present invention may be utilized as highly effective hydrogenation catalysts. It has been discovered that these catalyst systems have superior activity when compared to commercially available Raney metal catalysts and exhibit this activity at unusually lower temperatures and presure than are commonly employed. Thus, the catalyst systems of the present invention may be successfully employed to reduce, generally, any unsaturated organic compound capable of being reduced and preferably unsaturation in organic compounds possessing carbon-carbon, carbon-nitrogen and carbon-oxygen (as in carbonyl) unsaturation. Under certain conditions it can be used to hydrogenate carbon to methane and nitrogen to ammonia.

Feeds containing carbon-carbon unsaturation may be unsubstituted or substituted with additional functional groups and include olefinic compounds such as acyclic and cyclic mono-, di- and triolefins, acetylenic compounds and aromatic compounds. Typical examples of such compounds are: butylenes, pentenes, hexenes, octenes, nonenes, cyclohexene, cyclopentadienes, cyclopentenes, cyclooctadiene, cyclododecatrienes, cyclododecadiene, cyclododecene, vinyl cyclohexene, acetylene, hexyne-3, octyne-3, phenyl acetylene, benzene, toluene, xylene, naphthalenes and the like.

Feeds containing carbon-nitrogen unsaturation include nitriles, imines, oximes, heterocyclic nitrogen containing compounds, etc. Typical examples of such compounds are benzonitrile, benzylimine, quinoline, terephthalonitrile, isophthalonitrile, acetonitrile, propionitrile, tolunitrile, and the like.

Feeds containing carbonylic unsaturation include aldehydes, ketones and esters; typical examples of which are: acetone, methylethyl ketone, cyclohexanone, benzophenone, acetophenone, steroidal ketones, phorone, isophorone, benzaldehyde, acetaldehyde, propionaldehyde, propyl acetate, benzyl acetate, ethyl stearate, ethyl valerate and the like.

Since the hydrogenation reaction takes place with the feedstock in the liquid phase, any compounds falling within the definitions proposed for the feeds, that are in the liquid phase at reaction conditions (and capable of being reduced) may be utilized.

Hydrogenation reaction conditions may vary over wide limits depending upon the particular feedstock to be hydrogenated. Normally, hydrogenation reactions may be carried out at temperatures ranging from about $-20°$ C. to 500° C. preferably $-20$ to 250° C. and pressures in the range of about atmospheric to 15,000 p.s.i.g. of hydrogen, preferably atm. to 3000 p.s.i.g. and more preferably 25 to 1000 p.s.i.g. Olefinically unsaturated materials are most preferably hydrogenated at temperatures in the range of about 0–50° C. and pressures already indicated. When more difficulty reducible feedstocks are employed, such as nitriles and aromatics, the reaction rate can be enhanced by higher temperatures and hydrogen pressures, e.g. up to about 500° C. and up to about 15,000 p.s.i.g. may be employed.

The length of the hydrogenation reaction is not critical and reaction times ranging from 1 minute to 10 hours may be employed. Similarly, the concentration of catalyst may vary over wide limits with only small amounts being sufficient to effect substantial conversions of the feedstock. Ordinarily, 0.0001% to 1%, preferably 0.001 to 1% and more preferably 0.01 to 0.1% of the transition metal based on feed to the reaction, may be employed.

In another embodiment of the present invention, it has been discovered that the catalyst system of this invention may be used advantageously to selectively hydrogenate certain types of unsaturation in preference to other types of unsaturation. The selective hydrogenation reactions which may be conducted include, for example, the hydrogenation of acetylenic compounds present in small or trace amounts in a stream containing these acetylenes and olefins; the hydrogenation of terminal olefinic bonds in preference to internally bonded olefinic structures (this type of selective reduction will take place even when both terminal and internal olefinic bonds exist in the same structure); the selective hydrogenation of aliphatic unsaturation in preference to the hydrogenation of an aromatic nucleus and the like. Generally, selective hydrogenations will be governed by the type of catalyst and the appropriate solvent system employed. Also, the choice of the stabilizing ligands complexed with the zero valent transition metal can enhance the selectivity of a hydrogenation catalyst.

Thus, selective hydrogenation reactions may be effected at moderate temperatures and pressures, that is, at temperatures and pressures in the lower part of the ranges previously mentioned.

Further, selective hydrogenations will normally be enhanced by employing catalyst concentrations of a relatively low order. In addition, as above mentioned, catalyst systems of limited activity may be readily prepared using the organoaluminum reducing agent in molar ratios of 10/1 to 50/1, relative to transition metal. Thus, it can be easily seen that these selective hydrogenations are carried out at rather mild operating conditions. More specifically, selective hydrogenation reactions will normally occur at temperatures below about 100° C., preferably below about 50° C. while pressures will usually be below about 100 atm., preferably below about 20 atm., more preferably below about 10 atm., and catalyst concentrations below about 1000 p.p.m. Some typical examples of the selective hydrogenation reactions that may be conducted are: reduction of aliphatic carbon-carbon unsaturation at temperatures of about 0°–100° C., hydrogen pressures of 1–10 atm., and catalyst concentrations of about 10–100 p.p.m., e.g. vinylcyclohexene can be reduced to ethyl cyclohexene at about 20° C. and about 7 atm. hydrogen pressure; reduction of terminal olefinic bonds at temperatures of about −20 to +100° C., pressures of 1–20 atm., and catalyst concentrations of about 10–1000 p.p.m. It should be remembered that conditions outside of these ranges may also be employed, depending upon the feedstock to the hydrogenation reaction. Thus, for example, the reduction onf nitrile side chains on aromatic nuclei are usually effected at higher temperature and pressures. Some typical examples of the selective reactions that may be carried out are: vinylcyclohexene to ethylcyclohexene, cyclopentadiene to cyclopentene, cyclododecatriene to cyclododecadiene to cyclododecene, benzonitrile to benzylamine, benzophenone to diphenylmethane, etc.

The exact operating conditions under which selective hydrogenations may be conducted will vary with the particular feedstock and type of unsaturation involved. However, by following the general rules heretofore set forth, a person ordinarily skilled in the art will be able to determine the proper conditions for any selective hydrogenation.

This invention will now be further illustrated by the following examples. However, no limitations are to be inferred from these examples since modifications will be obvious to those skilled in the art.

Example 1.—Comparison of Raney nickel catalysts v. reduced transition metal type catalysts Approximately 100–120 mg. of acetylacetonates of iron, cobalt and nickel were weighed and charged to a reaction vessel. The respective salts were then reduced (as indicated in the table) with either a solution containing 2 ml. triisobutylaluminum in 10 ml. of heptane or 3 ml. of n-butoxy-aluminum diethyl in 10 ml. of heptane. The reductions occur instantaneously and a homogeneous solution is obtained. In some cases a precipitate is observed which dissolves upon dilution. 100 ml. of an 8% solution of cyclohexene in heptane was added to the catalyst system and the mixture was hydrogenated at a constant temperature of 22° C. and a constant pressure of 100 p.s.i.g. under stirring. Samples were taken from time to time and analyzed by gas chromatography.

Similar hydrogenations were also carried out utilizing the same feed, solvent, temperature and pressure and a Raney nickel catalyst. The results are tabulated below:

TABLE I

| Catalyst | Reducing Agent | Solvent | Time for 50% Conversion, min. |
|---|---|---|---|
| 76 mg. Raney-Nickel. | | n-Heptane | 115 |
| 17 mg. Fe | $Al(i-C_4H_9)_3$ | do | 57 |
| 25 mg. Co | $Al(i-C_4H_9)_3$ | do | 37 |
| 26 mg. Ni | $Al(C_2H_5)_2O(n-C_4H_9)$ | do | 38 |

The tabulated data indicate the much higher hydrogenation rate of the reduced catalysts compared with conventional Raney-nickel under comparable conditions.

Example 2

In a procedure similar to Example 1 several transition metal salts and chelates were reduced and screened for hydrogenation activity. The catalysts were prepared by treating approximately .4 mM. of the transition metal compound with 4 mM. of the organoaluminum reducing agent in a heptane solvent. Hydrogenation conditions and feeds similar to those employed in Example 1 were utilized. The results are tabulated below:

TABLE II

| Transition Metal in Catalyst | Reducing Agent | Solvent | Time for 50% Conversion, min. |
|---|---|---|---|
| Pt | $Al(i-C_9H_9)_3$ | Heptane | 29 |
| Cr | $Al(i-C_9H_9)_3$ | do | 109 |
| V | $Al(i-C_9H_9)_3$ | do | 112 |

It can readily be seen that the results reported show superior activity when compared with the Raney nickel catalyst reported in Table I. Additionally, similar experiments were carried out with titanium, manganese, copper and zinc complex catalyst systems and hydrogenation activity was observed although of a lesser degree than tabulated above.

Example 3

Following the procedures outlined in Examples 1 and 2 above, several experiments were carried out to determine the utility of other reducing agents and solvents in the complex catalytic system. The results are tabulated below:

TABLE III

| Transition Metal | Reducing Agent | Solvent | Time for 50% Conversion, min. |
|---|---|---|---|
| Co | $Al(i-C_4H_9)_3$ | Heptane | 34 |
| Co | $Al(i-C_4H_9)_3$ | Dimethoxyethane | 38 |
| Co | $Al(i-C_4H_9)_3$ | Triethylamine | 40 |
| Co | $Al(i-C_4H_5)_3$ | Benzene | 30 |
| Co | $Al(C_2H_5)_3$ | Heptane | 31 |
| Co | $HAl(i-C_9H_9)_2$ | do | 33 |

The data indicate that a wide variety of solvents and reducing agents may be used in the complex catalyst system of this invention.

Example 4.—Comparison of $AlR_2OR$ v. $AlR_3$ reducing agents in catalyst systems for the hydrogenation of CDT and cyclohexene.

106.5 mg. cobalt-II-acetylacetonate were reduced at room temperature with 1.6 g. $(C_2H_5)_2Al-O-nC_4H_9$ in 10 ml. of decane. Then 54 g. cyclododecatriene-cis-trans-trans and 20 ml. decane were added under nitrogen. The reaction mixture was charged into an autoclave and hydrogenated at 1000 p.s.i. $H_2$ and 55° C. After 44 minutes a sample was taken and analyzed. It showed that 100% conversion to cyclododecane had occurred.

In a similar experiment, .05 mM. cobalt-II-acetylacetonate were reduced with 2 mM. $(CH_3)_2AlOC_6H_5$ in benzene, Al/Co ratio was 40/1. The catalyst was used for the hydrogenation of 100 mM. cyclohexene at 20° C. and 50 p.s.i. $H_2$. Within 2 hrs. 18.4% cyclohexane had formed.

In another similar experiment .05 mM. Cobalt-II-acetylacetonate were reduced with 2 mM. $(CH_3)_2Al$-acetylacetonate in benzene. The catalyst was used for the hydrogenation of 100 mM. cyclohexene at 20° C. and 50 p.s.i. $H_2$. Within 2 hrs. 7.1% cyclohexane had formed.

The above experiments clearly indicate that reducing agents having the general formula $AlR_2OR$ are desirable in the process of this invention. The Al/Co ratio was 40/1 in each of two foregoing illustrations. However, where the $AlR_3$ system is employed, the catalyst is poisoned and catalytic activity is severely limited.

Example 5.—Comparison of $AlR_3$ v. etherate complex

Soluble cobalt catalysts were prepared by reaction of tri-isobutyl-aluminum with a solution of cobalt-II-acetylacetonate in benzene. This way several catalysts with a ratio Al:Co=4:1; 6:1; 8:1 and 10:1 were prepared. Another catalyst was prepared by reduction of the cobalt-chelate with the etherate tri-isobutylaluminum-p-dioxane, using a ratio of p-dioxane:Al:Co=10:8:1. These catalysts were used in the hydrogenation of cyclohexene at 50 p.s.i. $H_2$ constant pressure and 20° C. constant temperature. For each run 100 mM. cyclohexene and .1 mM. cobalt catalyst were taken, using ~ 90 ml. benzene as solvent. The results are given in the following table.

COMPARISON OF CATALYSTS PREPARED IN AND WITHOUT PRESENCE OF A LEWIS BASE

| Lewis Base | Al(i-C₄)₃:Co-II | Half-life Time for Hydrogenation of Cyclohexene (min.) |
|---|---|---|
| Ether(p-dioxane) | 8:1 | 12 |
| | 10:1 | 99 |
| | 8:1 | 47 |
| | 6:1 | 15 |
| | 4:1 | very slow |

The results are indicative of the increased catalyst activity which may be obtained when a polar solvent such as an ether is employed in the catalyst system and an etherate complex with the organoaluminum compound is formed.

Example 6.—Illustration of poisoning effect 110 mg. of cobalt acetylacetonate were reduced with 1.6 gm. of triethyl aluminum. The molar ratio of Al/Co was approximately 35/1. A solution of cyclohexene was added to the catalyst system and the mixture was hydrogenated at a constant temperature of 22° C. and a constant pressure of 100 p.s.i.g. Analysis of the final product indicated that there was no conversion of cyclohexene to cyclohexane. Similar results were obtained utilizing other trialkyl aluminum compounds as reducing agents and organoaluminum monochlorides.

The results indicate that the preferred conventional Ziegler polymerization catalyst compositions do not exhibit effective hydrogenation activity due to the critical nature of the Al/transition metal ratio.

Example 7

54 g. cyclododecatriene were hydrogenated at 50° C. and a constant hydrogen pressure of 1000 p.s.i. The catalyst was prepared in the following way: 143 mg. ferric-acetylacetonate were reduced with 2 ml. tri-isobutylaluminum in 10 ml. pentane. The reduction takes place immediately yielding a dark homogeneous product. To this is added the CDT and hydrogen pressured on. The reaction starts immediately which is noticed by a temperature rise. Samples are taken in intervals and analyzed by gas chromatography.

TABLE IV

| Time | Weight Percent | | | |
|---|---|---|---|---|
| | CDA¹ | CDE² | CDDE³ | CDT⁴ |
| (Min.) | | | | |
| 20 | 47.9 | 44.3 | 7.1 | 0.7 |
| 44 | 78.9 | 21.0 | 0.6 | |
| 91 | 100 | | | |

¹ Cyclododecane.
² Cyclododecene.
³ Cyclododecadiene.
⁴ Cyclododecatriene.

This example indicates that polyolefinic materials may be successfully hydrogenated by this invention.

Example 8.—Hydrogenation of aromatics

The catalyst was prepared by addition of 8.7 mM. tri-isobutylaluminum in 146 mM. p-dioxane to a solution of 1 mM. cobalt-II-acetylacetonate in 58 mM. p-dioxane. After aging the catalyst overnight, 225 mM. benzene were added and the mixture charged into an autoclave. The hydrogenation was carried out at 50° C. and 1200 p.s.i. constant hydrogen pressure. The reaction product was continually stirred at 1000 r.p.m. After 420 minutes a sample was analyzed which indicated that 82% of the benzene had been hydrogenated. The example indicates that aromatics may be hydrogenated by the process of this invention.

Example 9.—Reduction of carbon-nitrogen bonds 250 mg. cobalt-acetylacetonate was reduced with 2 ml. tri-isobutylaluminum to yield a homogeneous solution. To the catalyst thus obtained 40 g. benzonitrile were added and the hydrogenation performed at 1000 p.s.i. H₂ and 150° C. Within 6 hours all nitrile was converted to the corresponding amine, i.e. benzylamine. This example indicates that unsaturated nitrogen-carbon bonds may be reduced by the catalysts of this invention.

Example 10.—Reduction of heterocyclic carbon-nitrogen bond

A soluble cobalt catalyst was prepared by reacting a solution of .4 mM. cobalt-II-acetylacetonate in benzene with a benzene solution containing 4.0 mM. tri-isobutylaluminum and 5.0 mM. p-dioxane. Subsequently, 10.9 g. quinoline were added to the catalyst and then diluted to 50 ml. with p-xylene. The soluble mixture was changes to an autoclave and hydrogenated at 90–100° C., 1000 p.s.i. hydrogen pressure over 4 hours. After this time a sample was analyzed; it consisted of 11.3% quinoline, 78.3% 1,2,3,4-tetrahydro-quinoline, 8.9% 5,6,7,8-tetrahydro-quinoline, and 1.5% decahydro-quinoline.

Example 11

A soluble cobalt catalyst was prepared containing .43 mM. cobalt and 4 mM. tri-isobutylaluminum in heptane. To this catalyst were added 84 mM. quinoline and 9 mM. $(C_2H_5)_2S$. The product was hydrogenated at 1000 p.s.i. hydrogen pressure and 150° C. over 4 hrs. A sample after this time showed 17% 1,2,3,4-tetrahydro-quinoline. Although the reactivity of the catalyst has decreased under the influence of the sulfur compound, the hydrogenation activity was not killed. This example indicates that unsaturated heterocyclic nitrogen-containing compounds may be reduced by the process of this invention.

Example 12.—Selective hydrogenation at low temperature of a polyolefinic substance 105 mg. nickel-acetylacetonate were reduced at −6° C. with a solution of 3 ml. tri-isobutylaluminum in 50 ml. pentane. Then 44 g. cyclopentadiene monomer were added and the hydrogenation carried out at −6° C. and 1000 p.s.i. hydrogen presssure. Samples were withdrawn from time to time to evaluate the progress of the hydrogenation. The following table illustrates the selective hydrogenation achieved with the complex catalyst system:

TABLE V

| Percent Cyclopentadiene | Percent Cyclopentene | Percent Cyclopentane | Time (minutes) |
|---|---|---|---|
| 63.7 | 32.2 | 2.1 | 45 |
| 31.4 | 64.8 | 4.0 | 150 |
| 24.1 | 70.8 | 5.1 | 175 |
| 2.7 | 87.5 | 9.7 | 260 |

The results indicate that under controlled reaction conditions the catalyst systems of this invention may be made effective for highly selective hydrogenation.

Example 13.—Hydrogenation of carbon-oxygen bond 250 mg. cobalt acetylacetonate were reacted with 4 ml. tri-isobutylaluminum in 10 ml. pentane. Then a solution of benzophenone (20 g.) in 120 ml. ether was added which had been dried with 2 ml. tri-isobutylaluminum. The mixture was hydrogenated at 150° C. and 1500 p.s.i. for over 12 hours. Work-up of the reaction mixture and removal of solvents gave a product that consisted of 95% of diphenylmethane, 1% diphenylethane, the rest being polycondensated systems. No starting material was recovered. Thus the hydrogenation of the carbonyl compound to the hydrocarbon was accomplished indicating that unsaturated carbon-oxygen compounds may be hydrogenated by the process of this invention.

Example 14.—Selective hydrogenation of aliphatic olefinic bond 103 mg. cobalt-II-acetylacetonate in 6.8 g. diethylether are reduced with 1.6 g. tri-isobutylaluminum dissolved in 5 g. heptane. To this is added 10 g. 4-vinyl-cyclohexene-1 in 50 g. heptane solvent. The hydrogenation is carried out at 22° C., 100 p.s.i. under stirring. After 10 minutes of hydrogenation there is no more vinyl cyclohexene left, and 97% ethylcyclohexene and 3% ethylcyclohexane have been produced. Thus the high selectivity of this catalyst has been demonstrated.

Example 15.—Selective hydrogenation of acetylenes 110 mg. cobalt-II-acetylacetonate were dissolved in 4.3 g. dimethoxy-ethane and reduced with 1.6 g. tri-isobutyl-aluminum in 5 g. heptane. To this was added .5 g. phenyl-acetylene and 53 g. of a heptane solution of hexene-1, containing 6.6 g. hexene-1. The solution was hydrogenated at 22° C. and 100 p.s.i. hydrogen under stirring. The first sample after 10 minutes showed no phenylacetylene whereas only a trace of the hexene-1 was hydrogenated and no hexene-1 was isomerized. This example illustrates that the novel catalyst system can be used with advantage to remove traces of acetylenic compounds from feedstreams containing olefinic hydrocarbons.

Example 16.—Activating effect of other Lewis bases (16–20)

A nickel catalyst was prepared by reduction of .1 mm. nickel-II-acetylacetonate with .8 mm. tri-isobutylaluminum in benzene. The catalyst gave a half-life of 96 minutes in the hydrogenation of cyclohexene at 22° C./150 p.s.i.

The same catalyst was prepared as above and 1.0 mm. p-dioxane was added. Subsequent hydrogenation of cyclohexene (standard conditions) gave a half-life of 41 minutes.

Example 17

Part A: A hydrogenation catalyst was prepared by reduction of .4 mm. cobalt-II-acetylacetonate with 4.0 mm. tri-isobutylaluminum in 98 mm. cyclohexene. Hydrogenation at 22° C./100 p.s.i. gave 100% conversion in 203 minutes.

Part B: Subsequently a mixture of 8.0 cyclohexene (98 mm.) and 8.5 g. 1,2 dimethoxyethane (106 mm.) was added to the autoclave containing the catalyst and cyclohexane from previous run. Immediately after the addition the hydrogenation was continued at 22° C. and 100 p.s.i. After 58 minutes the hydrogenation was 100%.

Example 18

Cobalt-II-acetylacetonate (.4 mm.) is reduced with 4 mm. tri-isobutylaluminum in heptane. This is the same catalyst that was used in Example 18, Part A. Cyclohexene (99 mm.) and 8.96 g. (88 mm.) of N-methyl-morpholine were added to the catalyst and a hydrogenation was carried out under the same conditions as in Example 17. In 90 minutes 100% conversion was obtained versus 203 minutes without the third component.

Example 19

8.19 gms. of tri-isobutylaluminum (8 mm.) in a heptane solution were added to 0.1145 gms. cobalt acetylacetonate (~26.2 mg. Co~0.4 mm.). The solution rapidly turned black with white fumes over the liquid. 5 minutes later 34.88 gms. of cyclohexene (96 mm.) were added to the solution followed by 9.87 gms. Anisole (91 mm.). Hydrogenation at 22° C./100 p.s.i.g. $H_2$ gave 100% conversion in 155 minutes as compared to 203 minutes without the ether in Example 17, Part A.

Example 20

In an experiment similar to Example 19, diphenyl ether (74 mm.) was added to a similar solution of cyclohexene. Hydrogenation at 22° C./100 p.s.i.g. $H_2$ gave 100% conversion in 80 minutes, as compared to 203 minutes without ether in Example 17, Part A.

Example 21.—Use of weak organic acids as third components

In this test a series of various amounts of n-butanol are added as third components. Part A indicates the catalyst activity without third component. Part B shows the improvement upon addition of 6.3 mm. n-butanol. Part C shows that an excess of third component reduces the catalyst efficiency somewhat, however, the catalyst in C is still more active than in A.

Part A: Cobalt-II-acetylacetonate (.4 mm.) was reduced with triethylaluminum ,7.5 mm.) in heptane. The catalyst thus obtained was used in a cyclohexene hydrogenation at 22° C. and 100 p.s.i. It was very poor (2% in 2 hours).

Part B: Again .4 mm. cobalt-II-acetylacetonate was reduced with triethylaluminum (8.1 mm.) in heptane and then reacted 6.3 mm. n-butanol in heptane. The catalyst was immediately used for the standard hydrogenation of 99 mm. cyclohexene (same conditions as in Part A) giving a half-life time of 38 minutes.

Part C: Here .4 mm. cobalt-II-acetylacetonate was reduced with 7.9 mm. tri-isobutylaluminum in heptane and subsequently reacted with 26.5 mm. n-butanol. Immediately the catalyst was used for a standard cyclohexene (97 mm.) hydrogenation at 22° C. and 100 p.s.i. The catalyst gave 22% conversion in 4 hours.

Example 22

This example shows the effect of a preferred third component of the class of weak organic acids: t-butyl alcohol. It is assumed that the alcohol reacts with formation of a t-butoxy derivative of the catalyst. This new catalyst formed is superior in promoting effect, selectivity and handling. The following table shows that an excess of t-butyl alcohol does not reduce catalyst efficiency.

TABLE VI
[mM.=millimole]

| Transition Metal (mM.) | Third Component (mM.) | Relative Hydrogenation Rate [1] |
|---|---|---|
| Cobalt (1) | | .4 |
| Do | t-Butyl alcohol (36) | 49 |
| Do | t-Butyl alcohol (2,596) | 49 |
| Do | n-Butyl alcohol (36) | 9 |
| Do | n-Butyl alcohol (2,595) | 4 |

[1] In the hydrogenation of cyclohexene.

Example 23.—Use of air to effect catalyst efficiency

In this example a measured amount of air was used to stabilize the catalyst and increase hydrogenation activity.

Part A: Cobalt-II-acetylacetonate (102 mg.) were reduced with 2 ml. tri-isobutylaluminum. The resulting catalyst was used for the hydrogenation of cyclododecatriene (CDT) (54 g.) at around 55° C. and 1000 p.s.i. In 138 minutes only 11.8% cyclododecane was produced.

Part B: Similarly 103.7 mg. cobalt-II-acetylactonate was reduced with 2 ml. tri-isobutylaluminum in decane and 54 g. CDT were added. Subsequently, 49 ml. oxygen were added to the system (as air) under stirring. Then the hydrogenation was carried out at 53° C. and 1000 p.s.i. After 135 minutes the conversion to cyclododecane was 100%.

Example 24

The superiority of $AlR_2OR$ as reducing agent over $AlR_3$ is demonstrated for the selective hydrogenation of cyclooctadiene-1,5: catalyst A was prepared by reduction of 114 mg. cobalt-II-acetylacetonate with 3 ml. diethyl-aluminum-n-butoxide, whereas catalyst B was prepared by reduction of 111 mg. cobalt-II-acetylacetonate with 3 ml. tri-isobutylaluminum. In each hydrogenation 36 g. COD (cyclooctadiene-1,5) plus 40 ml. heptane were used. Each hydrogenation was carried out at ambient temperature and ~980–1000 p.s.i. constant pressure.

TABLE VII

| Catalyst | Time (min.) | Percent COD | Percent COE | Percent COA |
|---|---|---|---|---|
| A | 45 | 63 | 34.7 | 2.3 |
| B | 41 | 2.4 | 32.5 | 65.1 |

COD=Cyclooctadiene. COE=Cyclooctene. COA=Cyclooctane.

Example 25

Cobalt-II-acetylacetonate (104 mg.) was reduced with 4 ml. diethylaluminum-n-butoxide and subsequently used for the hydrogenation of octyne-4. At 995 p.s.i. and 56° C., after 70 minutes 97% selectivity towards octenes at 100% conversion was obtained.

Example 26—Low pressure hydrogenation of cyclohexane

Cobalt-II-acetylacetonate (.1 mm.) was reduced with tri-isobutylaluminum (.6 mm.) and the catalyst used to hydrogenate cyclohexene (150 mm.) at 25 p.s.i. and 20° C. A half-life of 24 min. was obtained.

Example 27

A reduced nickel catalyst was prepared from 540 mg. nickel-II-acetylacetonate and 10.8 g. of an equimolar mixture of diethylaluminum chloride and ethyl aluminum dichloride (ethyl aluminum sesquichloride). A portion of this catalyst was used to hydrogenate 80 g. of dicyclopentadiene at ambient temperature and 1000/1700 p.s.i. Analysis indicated that the product consisted of 73% dihydro and 27% tetrahydro derivatives.

Example 28

The following table lists other unsaturated hydrocarbons that can be successfully hydrogenated utilizing the process of this invention.

TABLE VIII

| Compound | Product | Conv. percent | Temp., °C. | Press., p.s.i. | Trans. Metal |
|---|---|---|---|---|---|
| Norbornene | | 99+ | Ambient | 1,400 | Ni |
| Hexene-1 | Hexane | 93+ | do | 250 | Fe |
| Cyclooctadiene | Cyclooctane | 100 | 30 | 1,000 | Co |
| 3-methylbutene-1 | 3-methylbutane | 91.5 | Ambient | 990 | Fe |
| 2-methylbutene-2 | 2-methylbutane | 23 | 50 | 990 | Co |

In each case the acetylacetonate of each transition metal was reduced with tri-isobutylaluminum.

Example 29

This example demonstrates the feasibility of a co-reduction of two different transition metal chelates which is of advantage in the preparation of more temperature and poison resistant catalysts.

A mixture of cobalt-II-acetylacetonate (54.6 mg.) and nickel-II-acetylacetonate (51.6 mg.) were reduced in heptane with tri-isobutylaluminum (1.6 g.). The co-reduced catalyst was successfully used in the hydrogenation of cyclohexene (97 mM.) at 22° C. and 100 p.s.i. After 183 min. 87% of the cyclohexene had been hydrogenated.

What is claimed is:

1. A process for reducing unsaturated organic compounds having unsaturated sites selected from the group consisting of carbon-carbon, carbon-nitrogen, and carbonyl unsaturation which comprises reacting the unsaturated compound with hydrogen at temperatures of about −20° to +250° C. and hydrogen pressures of about atmospheric to about 3000 p.s.i.g. in the presence of a catalyst consisting essentially of the reaction product of a transition metal salt and an organoaluminum compound having the formula $AlR_2OR$ wherein R is a $C_1$–$C_{20}$ hydrocarbyl radical and the molar ratio of aluminum to transition metal is at least 1/1, and in the presence of an inert solvent.

2. The process of claim 1 wherein the transition metal is selected from the group consisting of iron, cobalt, and nickel.

3. The process of claim 1 wherein the transition metal salt is a chelate.

4. The process of claim 1 wherein the molar ratio of aluminum to transition metal is about 5/1 to 30/1.

5. The process of claim 1 wherein the unsaturated compound contains carbon-carbon unsaturation.

6. A process for reducing unsaturated organic compounds having unsaturated sites selected from the group consisting of carbon-carbon, carbon-nitrogen, and carbonyl unsaturation which comprises reacting the unsaturated compound with hydrogen at temperatures of about −20° to +250° C. and hydrogen pressures of about atmospheric to about 3000 p.s.i.g. in the presence of a catalyst consisting essentially of the reaction product of a transition metal salt, an organoaluminum compound having the formula $AlR_3$ wherein R is selected from the group consisting of hydrogen, halogen, and $C_2$–$C_{20}$ hydrocarbyl radicals and at least one R is hydrocarbyl, and a third component selected from the group consisting of Lewis bases, weak organic acids, and oxygen, the molar ratio of third component to aluminum being about 1/1 to 10/1, and the molar ratio aluminum to transition metal is at least 1/1.

7. The process of claim 6 wherein the third component is a Lewis base.

8. The process of claim 7 wherein the transition metal is selected from the group consisting of iron, cobalt, and nickel.

9. The process of claim 7 wherein the transition metal salt is cobalt acetylacetonate.

10. The process of claim 7 wherein the Lewis base is an ether.

11. The process of claim 10 wherein the catalyst consists essentially of a homogeneous solution of a transition metal salt and an etherate, the etherate being a complex derived from the reaction an aluminum trialkyl, each alkyl of which contains 2–20 carbon atoms, and an ether.

12. The process of claim 6 wherein the unsaturated compound is an olefin and the temperature is about 0° to 50° C. and the pressure is about 25 to 1100 p.s.i.g.

13. The process of claim 6 wherein the third component is a weak organic acid.

14. The process of claim 13 wherein the weak organic acid is a $C_1$–$C_{20}$ alcohol.

15. The process of claim 13 wherein the weak organic acid is tertiary butyl alcohol.

16. The process of claim 6 wherein the third component is oxygen.

17. A process for reducing unsaturated organic compounds having unsaturated sites selected from the group consisting of carbon-carbon, carbon-nitrogen, and carbonyl unsaturation which comprises reacting the unsaturated compound with hydrogen at temperatures of about −20° to +250° C. and hydrogen pressure of about 25 p.s.i.g. to 1000 p.s.i.g. in the presence of a catalyst consisting essentially of the reaction product of a transition metal salt, wherein the transition metal is selected from the group consisting of iron, cobalt, and nickel, an organoaluminum compound of the formula $AlR_3$ wherein R is selected from the group consisting of hydrogen, halogen, and $C_1$–$C_{20}$ hydrocarbyl and at least one R is hydrocarbyl, and an ether, the molar ratio of ether to aluminum being about 1/1 to 10/1 and the molar ratio of aluminum to transition metal is at least 1/1.

18. The process of claim 17 wherein the reaction is carried out in the presence of a solvent selected from the group consisting of hydrocarbons, ethers, amines, and alcohols.

19. The process of claim 17 wherein the unsaturation is carbon-carbon.

20. The process of claim 17 wherein the transition metal salt is cobalt acetylacetonate.

21. A process for preparing a hydrogenation catalyst which consists essentially of reacting a transition metal salt, an organoaluminum compound of the formula $AlR_3$ wherein R is selected from the group consisting of hydrogen, halogen, $C_2$–$C_{20}$ hydrocarbyl radicals and at least one R is hydrocarbyl, and a third component selected from the group consisting of Lewis bases and weak organic acids, at temperatures of about −60° to +150° C., the molar ratio of third component to aluminum being about 1/1 to 10/1, and the molar ratio of aluminum to transition metal is at least 1/1, thereby forming a reaction product containing the transition metal which is in a reduced valence state.

22. The process of claim 21 wherein the third component is a Lewis base.

23. The product of claim 22.

24. The process of claim 21 wherein the third component is a weak organic acid.

25. The process of claim 24 wherein the weak organic acid is a tertiary alcohol.

26. The product of claim 25.

27. Method for the preparation of a complex hydrogenation catalyst which comprises reacting in an inert liquid hydrocarbon diluent at a temperature in the range from about −60° C. to +150° C., compounds consisting essentially of
   (a) one formula weight of a metal salt of an acidic organic compound, said metal having an atomic number greater than 25 and less than 29, and said organic acid having a pKa in the range from about 1–20, from 1–25 carbon atoms, from 1–2 acidic hydrogen atoms, and only carbon, hydrogen, and oxygen; and
   (b) from 1–10 moles of a Mendeleyev Periodic Table Group III organometallic compound, $MR_3$, in which M is a Group III element and R is selected from the radical groups consisting of hydrocarbyl and hydrogen, said hydrocarbyl radicals having from 1–20 carbon atoms per group, and wherein at least one radical group of said compound is hydrocarbyl.

28. The method of claim 27, wherein said reacting is in the absence of a solvent.

29. The method of claim 27, wherein aluminum is the metal component.

30. The method of claim 29, wherein for each formula weight of said metal salt, 1 to 4 moles of said organometallic compound is used in the reacting.

31. The method of claim 30, wherein said organic acid is mono basic, having a solubility in benzene in parts per 100 parts at 25° C. of at least 0.1 part.

32. The method of claim 31 wherein said organic acid is carboxylic, having a pKa less than 9.

33. The composition of claim 32.

34. Method of decreasing the unsaturation of a reducible organic compound which comprises contacting said compound in the liquid phase with hydrogen in the presence of about 0.001–1.0 formula percent of a complex hydrogenation catalyst prepared as in claim 27, said contacting being at a temperature in the range −20° to 500° C. at a hydrogen pressure of from atmospheric to 15,000 p.s.i.g. and for a period of from about 1 minute to 10 hours, and recovering the resulting hydrogenated organic compound.

35. The method of claim 33 wherein said catalyst is prepared as in claim 32, and said reducible compound is an unsaturated hydrocarbon.

36. The method of claim 34 wherein said reducible hydrocarbon is a cyclic hydrocarbon.

References Cited

UNITED STATES PATENTS

| | | | |
|---|---|---|---|
| 3,113,986 | 12/1963 | Breslow et al. | 260—667 |
| 3,205,278 | 9/1965 | Lapporte | 260—667 |
| 3,247,270 | 4/1966 | Kirk | 252—428 |
| 3,281,375 | 10/1966 | Vandenberg | 252—429 |

DELBERT E. GANTZ, *Primary Examiner.*